April 30, 1940.　　　　E. L. KASTLER　　　　2,198,623
TRUNK PISTON
Filed Oct. 18, 1938
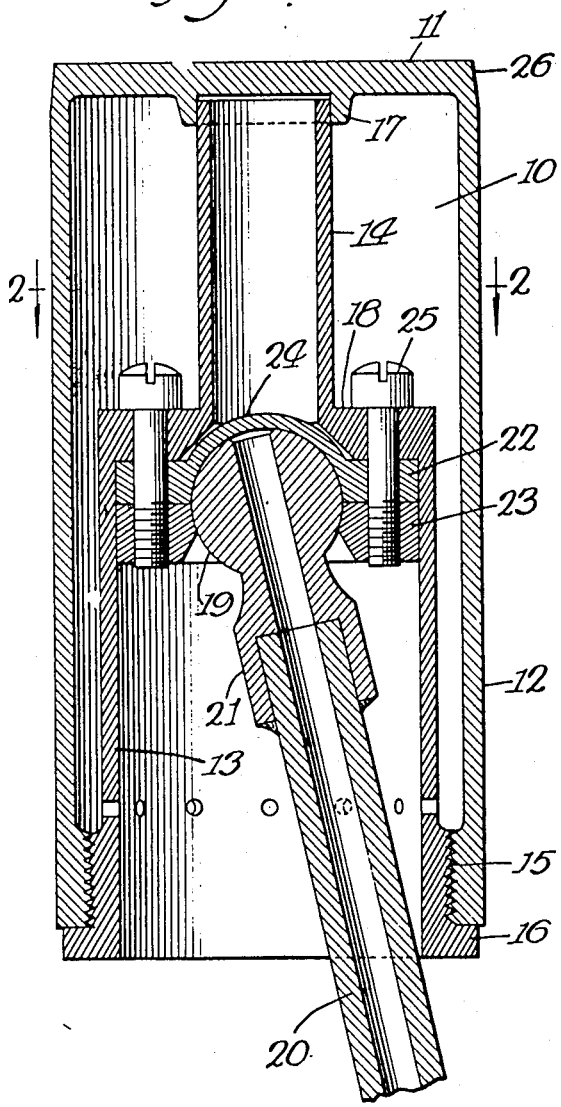
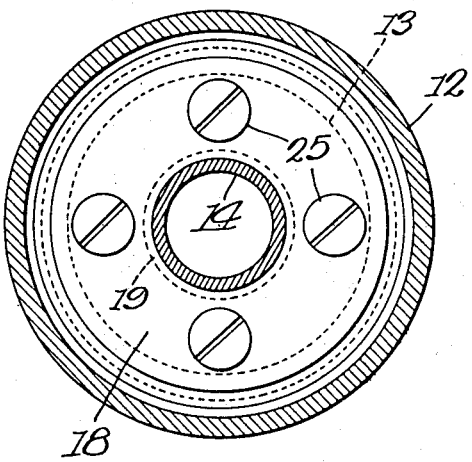
Inventor:
Edward L. Kastler Patented Apr. 30, 1940

2,198,623

UNITED STATES PATENT OFFICE 2,198,623

TRUNK PISTON

Edward L. Kastler, Waukegan, Ill.

Application October 18, 1938, Serial No. 235,618

6 Claims. (Cl. 309—16)

The objects of the invention are to provide a piston of the trunk type in which the pivotal attachment of the connecting rod is wholly within the body of the piston and spaced from its walls; in which the lateral pressure of the rod is distributed throughout the length of the piston; and in which the walls are relieved of all out-of-round distortion caused by wrist pin bearing strains. Other and further objects of the invention will appear in connection with its description.

A preferred embodiment of the invention is herein described, and is illustrated in the accompanying drawing, in which Fig. 1 is a longitudinal central section of such embodiment of the invention, showing a portion of the connecting rod; and Fig. 2 is a transverse section on the line 2—2 of Fig. 1.

The body 10 of the piston is shown as a hollow cylindrical casting, closed at one end to provide a head of sufficient thickness to withstand the pressure which may be applied to it, and open at its opposite end. The side wall 12, may be of less thickness than the head, as shown.

A two-diameter cylindrical core 13, 14 occupies the chamber of the body 10, its larger section 13 being at the outer end thereof and in threaded engagement with the piston body 10, as shown at 15. As the larger body portion of the core is preferably spaced from the wall 12, each of these parts is provided with a thickened rim, the one instanding and the other outstanding. The outer end of the core section 13 is provided with an outstanding rim 16 which makes contact with the end of the piston wall and provides a shoulder to receive the outward force applied to the head 11 and transmit it to the piston rod. The inner end portion 14 of the core slidingly engages a boss 17 provided on the inner face of the head 11 and which preferably is annular in form. The core thus becomes a beam connected at both ends to the piston body 10, to receive all lateral forces from the bearing 19, and distribute them throughout the entire length of the body.

The shoulder 18 uniting the core sections 13, 14, is thickened for strength and to it is secured the socketed bearing for the spherical head or ball 19 of the piston rod 20. This ball is provided with a radially projecting socketed shank 21, the maximum diameter of which is less than the diameter of the ball.

The socket providing the complete bearing for the ball 19 is formed in a pair of circular plates 22, 23 which preferably fit snugly within the core section 13. The plate 22 has a central hollow dome portion 24, and the plate 23 is in the form of an annulus, the inner wall of which forms an extension of the socket of the plate 22 and completes the bearing for the ball 19.

In assembling these elements the shank 21 is thrust through the annulus 23, the internal diameter of which is slightly greater than the diameter of the shank and the piston rod 20 is inserted into the socket formed in the shank and secured as by braizing. The ball 19 being now fitted within the socket in the plate 22, that plate and the annulus 23 are secured together and to the shoulder 18, as by screws 25.

The piston rod is provided with a longitudinal passage, as shown, which is continued through the ball 19 to provide for its pressure lubrication from the bearing of the crank pin of the motor.

Outward pressure is transmitted longitudinally upon the shoulder 16 without causing any distortion of the body 10; and delivered to the pitman through the outer element of the core and the bearing socket 24.

Longitudinal inward pressure is transmitted from the pitman through the threaded joint 15, and flange 16 to the body 10, without causing any distortion thereof.

Lateral pressure due to obliquity of the connecting rod is transmitted to both ends of the body of the piston through the core element, and piston distortion is thereby avoided.

The piston, due to its ball bearing connection is free to float or creep circumferentially within the cylinder in which it is working, thus distributing wear over the piston surface and prolonging life.

Maintenance of the true circular form of piston by the prevention of wrist pin distortion of its thin side walls, permits closer fitting of piston within the cylinder than is otherwise possible, and eliminates the necessity for compression and oil scraping rings. It is well known that a materially expanding temperature is developed in trunk pistons for a very short distance only from the inner end, and it may be found advisable in some instances to slightly taper the inner end of the body.

The core section 13 may be perforated, as shown, adjacent its outer end to relieve the air pressure when heated.

Any suitable locking means for the threaded connections may be used. While the ball bearing form of connection of the pitman is greatly to be preferred, it is not essential, many of the advantages of the invention being secured through a pin bearing being used.

I claim as my invention:

1. In a trunk piston, in combination, a chambered body having a closed end provided with a central instanding boss, a tubular core fixedly attached to the body adjacent to its open end and slidingly engaging the boss, and a pivot bearing carried by the core intermediate of its ends for engagement with a pitman.

2. In a trunk piston, in combination, a chambered body having a closed end provided with a central instanding boss, a two diameter core the larger portion being of less diameter than the body, its two sections being united by an annular shoulder, the core section of the greater diameter being positively attached at its outer end to the wall of the body and the section of the lesser diameter slidingly engaging the boss, and a two part ball bearing socket attached to the shoulder for engagement by a complementary pitman.

3. In a trunk piston, in combination, a chambered body having a closed end provided with a central instanding boss, a two diameter core of less diameter than the body, its two sections being united by an annular shoulder, the core section of the greater diameter being attached at its outer end to the wall of the body and the section of the lesser diameter slidingly engaging the boss, and a two part ball bearing socket attached to the shoulder for engagement by a complementary pitman, the core having a radial flange at its outer end for engaging the end of the piston body.

4. In a trunk piston, in combination a chambered body having a closed and an open end, a bearing element within the body and adapted for pivotal engagement with a pitman and being positively secured to the body adjacent the outer end thereof and being slidably anchored to its closed end.

5. In a trunk piston, in combination a hollow cylindrical body closed at one end only, and having an axial projection from the inner face of its closed end, a core co-axial with and of less diameter than the chamber of the body and being attached to the body at the outer end thereof and having longitudinal sliding engagement with the piston head projection, the core having a bearing intermediate of its ends for a piston rod.

6. A hollow trunk piston having a closed and an open end, a pivot bearing located within the chamber of the piston intermediate of its ends and spaced from its side walls, rigid connection between the bearing element and the open end of the piston including a radial flange engaging the end of the piston wall, and means anchoring the bearing element to the piston head against lateral movement but permitting relative axial play of such parts.

EDWARD L. KASTLER.